United States Patent [19]

Yoshimi et al.

[11] Patent Number: 5,126,645
[45] Date of Patent: Jun. 30, 1992

[54] GRINDER ROBOT

[75] Inventors: Takashi Yoshimi, Tiba; Makoto Jinno, Kanagawa, both of Japan

[73] Assignee: Kabushiki Kaisha Toshiba, Kawasaki, Japan

[21] Appl. No.: 589,517

[22] Filed: Sep. 28, 1990

[30] Foreign Application Priority Data

Sep. 30, 1989 [JP] Japan ................................ 1-255461

[51] Int. Cl.$^5$ .............................................. G05B 19/42
[52] U.S. Cl. ......................... 318/568.11; 318/568.22; 318/571; 318/570; 318/578; 901/41; 364/474.03
[58] Field of Search ........... 318/568.1, 568.11, 568.16, 318/568.17, 568.18, 571, 572, 603, 625, 568.22, 39; 364/474.06; 228/102

[56] References Cited

U.S. PATENT DOCUMENTS

| | | | |
|---|---|---|---|
| 3,859,760 | 1/1975 | Grieb et al. | 318/603 |
| 4,630,214 | 12/1986 | Barney et al. | 318/39 |
| 4,817,848 | 4/1989 | Gabaldon | 228/102 |
| 4,826,392 | 5/1989 | Hayati | 318/625 |
| 4,894,597 | 1/1990 | Ohtomi | 318/568.22 |
| 4,904,152 | 2/1990 | Doi et al. | 318/568.11 |

FOREIGN PATENT DOCUMENTS

0107147  5/1984  European Pat. Off.
WO88/03460  5/1988  PCT Int'l Appl.

*Primary Examiner*—Paul Ip
*Attorney, Agent, or Firm*—Foley & Lardner

[57] ABSTRACT

A grinder robot having a grinder can be operated by both of a force control and a position control to grind a workpiece surface quickly and acccurately. When the grinder has not reached a target grinding point position to finish grindings, force loop drive control means are selected to drive the grinder in order to grind a work by a force control. After a grinding point ground by the grinder has reached the target position, then, position drive control means are selected to drive the grinder by a position control in order to execute precise grindings. A grinding amount in every grinding in a force control area is relatively large and a grinding speed in every grinding in a position control area is relatively fast. As a result, a workpiece can be ground quickly and accurately by the grinder robot.

9 Claims, 8 Drawing Sheets

GRINDER ROBOT

BACKGROUND OF THE INVENTION

1. Field of the Invention

The present invention is related to a grinder robot which grinds a workpiece using a grinder equipped at the tip of the robot arm and by moving the grinder towards the workpiece. Especially, this invention is related to a grinder robot by which a workpiece can be grinded quickly and accurately.

2. Description of the Prior Art

In general, a grinding machine controls a grinder to move relatively to and from a work by a position feedback loop. In other words, a grinding machine in prior arts controls grinding points of a grinder to be target positions for grindings by a position loop, and makes a finishing surface to be a target surface.

However, the grinding machine, in which a grinder is controlled to move by a position loop as mentioned above, detects only positions by the loop. It may, therefore, damage a grindstone by forcing it to grind a rugged surface of a workpiece if the grinder is set to grind directly towards a target position. This is because the grinder cuts into the rugged surface. To avoid this, the grinder can be moved slowly in every shuttle move so as to reach the target position gradually. In this case, however, a problem of increasing processing time arises.

In order to avoid disadvantages arising from the use of this kind of grinder robot controlled by a position loop the force given to the grinder can be detected and the robot arm's movement can be controlled so as to keep the force constant. In this method, however, it is difficult to grind a work surface completely smooth, because it cannot control the position of grinding point.

SUMMARY OF THE INVENTION

The object of this invention is to overcome the problems mentioned above. The object of this invention is, therefore, to provide a grinder robot, in which a grinder is able to grind surfaces quickly and accurately without cutting into the surfaces.

In the first aspect of this invention, there is provided a grinder robot to grind a workpiece by holding a grinder in the tip of a robot arm, which is provided to move freely towards a working table; and then by moving the grinder towards a workpiece placed on said working table, comprising; means for detecting force given to said robot arm from said work through said grinder; means for detecting positions of said grinder; and a controller for controlling the movement of said grinder. The controller is also comprised of means for indicating target positions to finish grindings of said workpiece; position loop drive control means; force loop drive control means; and means for selecting either one of said drive control means. After obtaining feedback values of position detecting signals detected by said position detecting means, said position loop control means control the move of said robot arm in a direction towards said work, by a position and velocity feedback loop according to said target positions, which are indicated by said indicating means. Said force loop drive control means controls the movement of said robot arm within said direction by a force feedback loop, after obtaining force feedback values detected by said force detecting means. Also, said selection means selects either one of said drive control means, according to positions of said grinding points of said grinder and/or a force given to said grinder.

According to the first aspect of this invention, position loop drive control means and force loop drive control means are provided in the controller. One of these drive control means may be selected according to grinding positions of the grinder and/or said force given to said grinder. For example, said force loop drive control means should be selected until the grinding point of the grinder has reached to the target, and said position loop drive control means should be selected after the grinding point of the grinder has reached to the target, under a condition that grinding force given to the work is in set values. As a result, a grinding may be carried out quickly and accurately.

In the second aspect of this invention, there is provided a grinder robot which has a grinder in the tip of a robot arm and grinds workpiece surfaces into any shape. The grindings are carried out by controlling the grinding force given to the workpiece by the grinder, until a grinding point has reached to a target position for finishing. The grindings are also carried out by controlling a grinder position, after a grinding point has reached to the target position for finishing, under the condition that the grinding force is in set values. In this case, the feeding speed of the grinder drived by a position control, should be set faster than that of the grinder drived by a force control.

According to the second aspect of this invention, a grinding amount of a surface in each grinding becomes large by setting the feeding speed of a grinder relatively slow, until a grinding point has reached to the target position for finishing and so far as a force control is selected. After a grinding point has reached the target position for finishing insofar as a position control is selected, the feeding speed of a grinder is selected faster than that of the grinder driven by a force control. As a result, the total amount of processing time becomes short, and a surface of a work can be grinded into any shape correctly and efficiently by using a grinder robot of this invention.

These and other objects, features and advantages of the present invention will be more apparent from the following description of a preferred embodiment, taken in conjunction with the accompanying drawings.

DETAILED DESCRIPTION OF THE EMBODIMENTS

Figure 1:
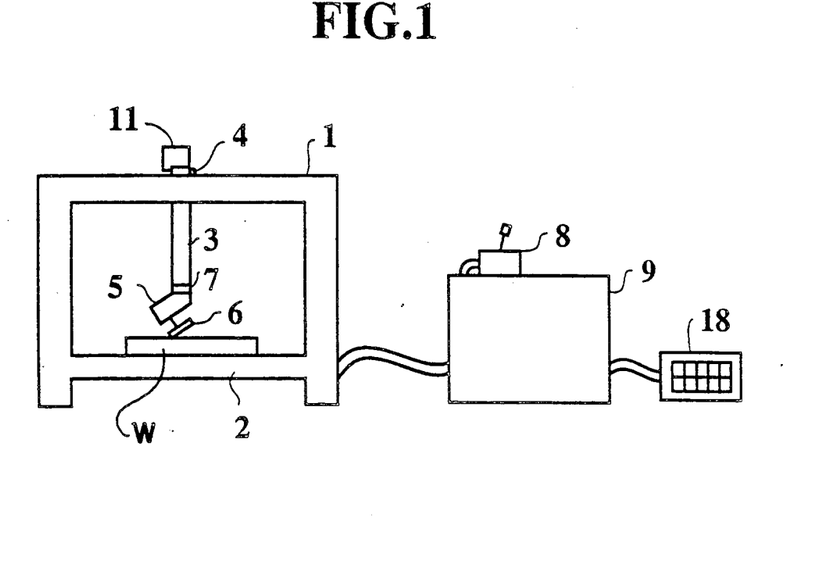
FIG. 1 is a schematic diagram showing a structure of a grinder robot according to this invention.

FIG. 1 is a front view showing an outline structure of a grinder robot according to one embodiment of this invention.

Figure 2:
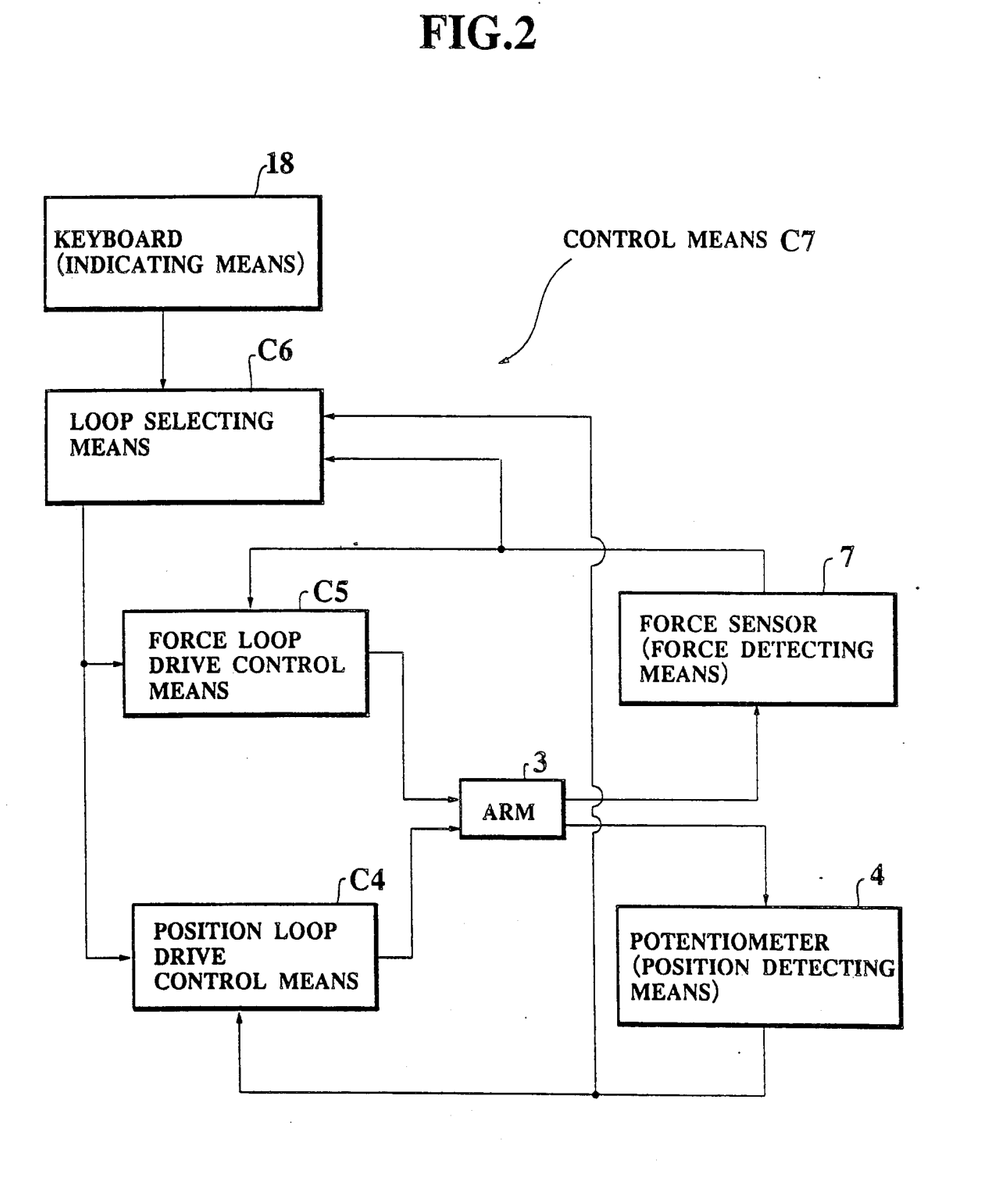
FIG. 2 is a block diagram showing a control part of the grinder robot illustrated in FIG. 1.

As shown in the figure, a working table 2 is placed on the bottom surface of a frame 1, which forms the main body of an apparatus. A workpiece W to be ground can be fixed on working table 2. A robot arm 3 of the 3 degrees of freedom Cartesian coordinate type is mounted on the top surface of said frame 1 for free movement above said working table 2. On the top end of robot arm 3, a potentiometer (a position detecting means) 4 is mounted to detect vertical movements of the arm. The main body of a grinder 5 is also mounted in the tip of robot arm 3. A grindstone 6 is rotatably attached to the main body of the grinder 5. A force sensor (force detecting means) 7, such as a strain gauge, is provided between the main body of grinder 5 and arm 3 to detect a force transmitter to grindstone 6 from workpiece W. A z axis motor 11 is also provided on arm 3 so as to move robot arm 3 vertically (z direction). Furthermore, a controller 9 is provided beside a side surface of said frame 1, which has a joy stick 8 used to indicate feeding speeds and feeding directions of said grinder 5. Control members corresponding to control means C7 shown in FIG. 2 are built inside of this controller 9.

In the grinder robot having said structure, the position (Zo) of the finishing target is input by means of a keyboard (indicating means) 18. By operating joy stick 8, arm 3 can, then, be moved in all directions in a horizontal plane (X Y directions) and with any speed, with pushing a rotating grindstone 6 of grinder to the upper surface of work W.

Now, control means C7 9 in FIG. 1 will be explained below with referring to FIG. 2.

Control means C7 include position loop drive control means C4 a, force loop drive control means C5, and a loop selecting means C6. After obtaining feedback values of position detecting signals which are detected by potentiometer 4 (position detecting means), means C4 controls the drive of robot arm 4 by a feedback loop concerning position and velocity in the direction towards said workpiece according to said target positions input by keyboard 18 (indicating means). As described above, keyboard 18 indicates target positions for finishing up grindings of said workpiece W. On the other hand, said means C5 control the drive of said robot arm in the same direction mentioned above, by a force loop according to force feedback values, which are detected by force sensor 7 (force detecting means). According to positions of grinding points by said grinder and/or forces given to said grinder, said loop selecting means C6 select either one of said drive control means C4 or C5.

As explained above, control means C7 of this invention includes position loop drive control means C4 and force loop drive control means C5, and selects either one of these means C4 or C5 by loop selecting means C6 according to positions of grinding points and/or forces given to said grinder. For example, means C5 may be selected until the grinding point of the grinder has reached a target position for finishing and said means C4 may be selected after the grinding point of the grinder has reached to said target position under the condition that the force given to the grinder is in set range of values.

Figure 3:
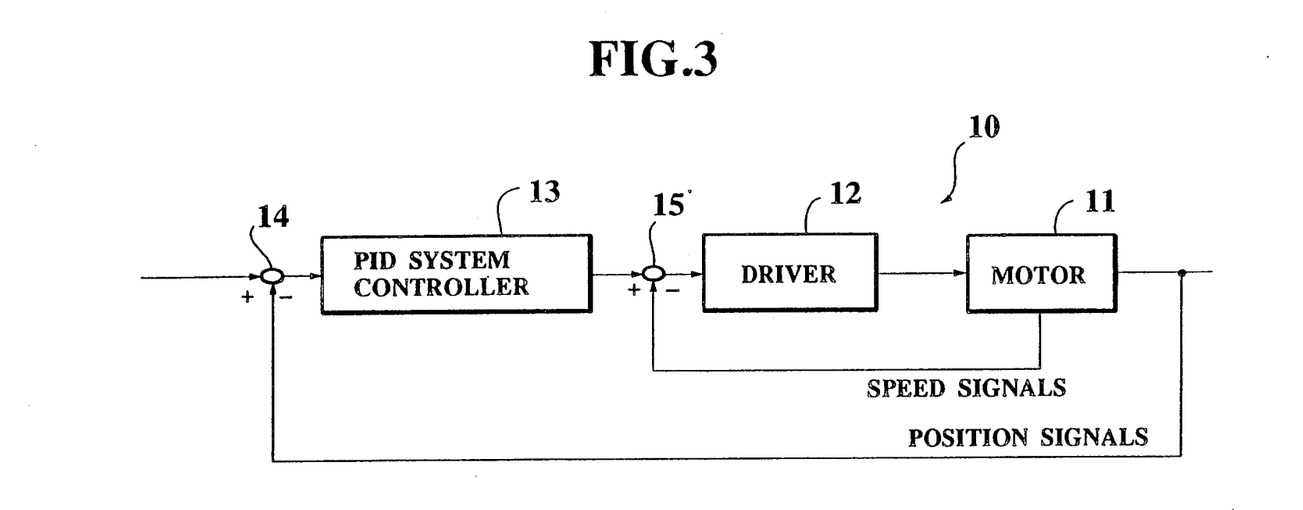
FIG. 3 is a block diagram showing a position loop drive control part.

FIG. 3 shows a block diagram of a position loop drive control part, which corresponds to said position loop drive control means C4 shown in FIG. 2.

Position loop drive control part 10 in this embodiment drives said arm 3 vertically (Z-direction). This part 10 includes a driver (servo amplifier) 12 connected to said Z-axis motor 11, a PID (proportional, integral, derivative) controller 13, a position comparator 14, and a speed comparator 15. These comparators 14 and 15 form a position feedback loop and a velocity feedback loop for instruction, according to position signals from said potentiometer 4 and velocity signals from said motor 11.

Figure 4:
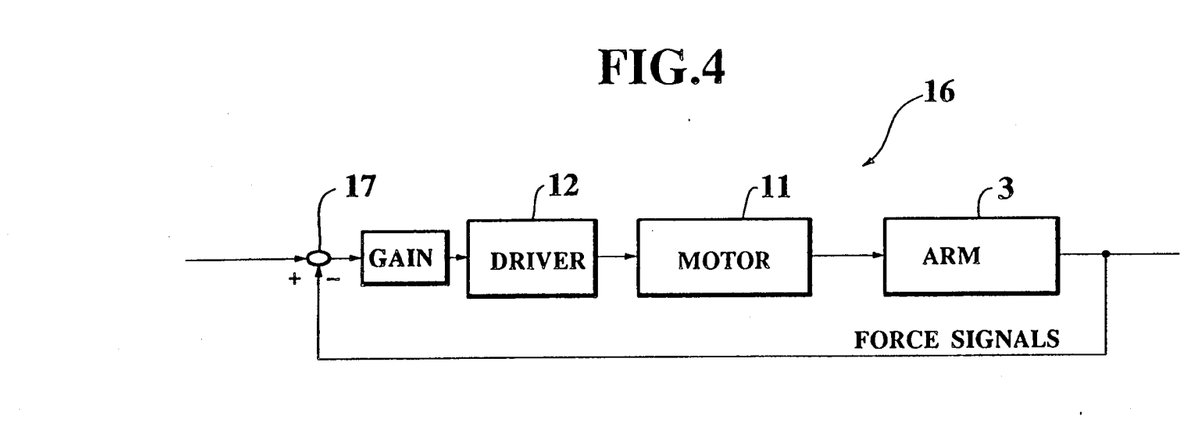
FIG. 4 is a block diagram showing a force loop drive control part.

FIG. 4 illustrates a block diagram of a force loop drive control part 16, which corresponds to said force loop drive control means C5 shown in FIG. 1.

This part 16 in this embodiment drives said arm 3 vertically (Z direction) according to force feedback signals. This part 16 includes, also, a force comparator 17 to compare force signals detected by said force sensor 7 with a predetermined constant value. Driver 12 is driven by deviation signals from said comparator 17.

Figure 5:
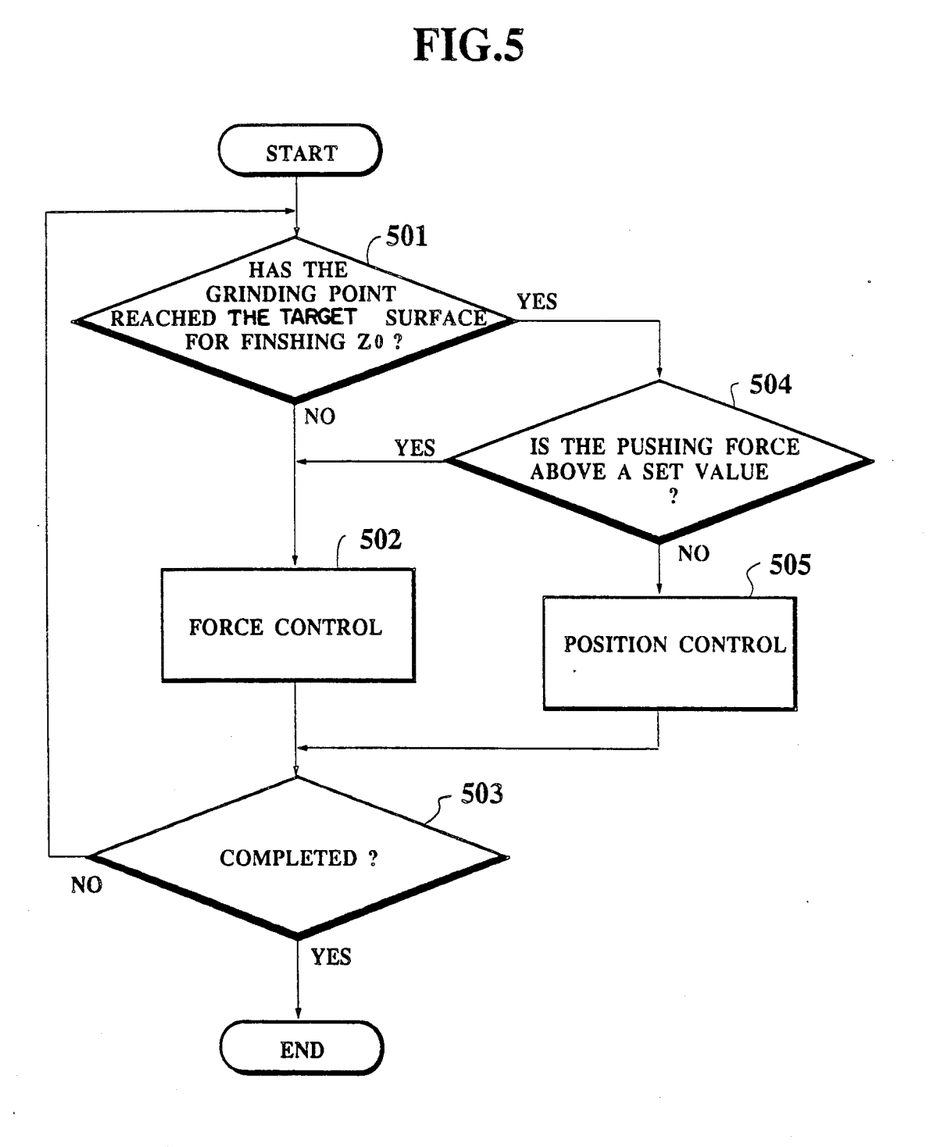
FIG. 5 is a flowchart showing one example of a control process of the grinder robot illustrated in FIG. 1.

A drive control procedure of Z axis motor 11 by position and force controls, is illustrated in FIG. 5.

At first, whether a grinding point reaches a target surface for finishing or not should be detected in step 501. A force control in step 502 may, then, be selected until the point reaches the target surface. This force control is carried out by force loop drive control part 16 shown in FIG. 4. Thus, grindstone 6 of grinder 5 is pushed toward workpiece W with a constant force during the force control operation.

On the other hand, step 504 may be selected if the grinding point is judged to be on the target surface in step 501. In that step 504, whether the grinding force is more than a set value or not should be judged. In the case that the grinding force is more than the set value, step 502 may be selected to keep the grinding force within constant values by a force control operation executed in force loop drive control part 16 shown in FIG. 4.

In step 504, if the grinding force is judged to be under the set value, then, step 505 may be selected to execute a position control which will be carried out by position loop drive control part 10 shown in FIG. 3. In step 503, a completion of grindings should be judged. If a completion of grindings is not detected in step 503, step 501 may then be chosen to execute again until a completion is found in step 503.

Figure 6:
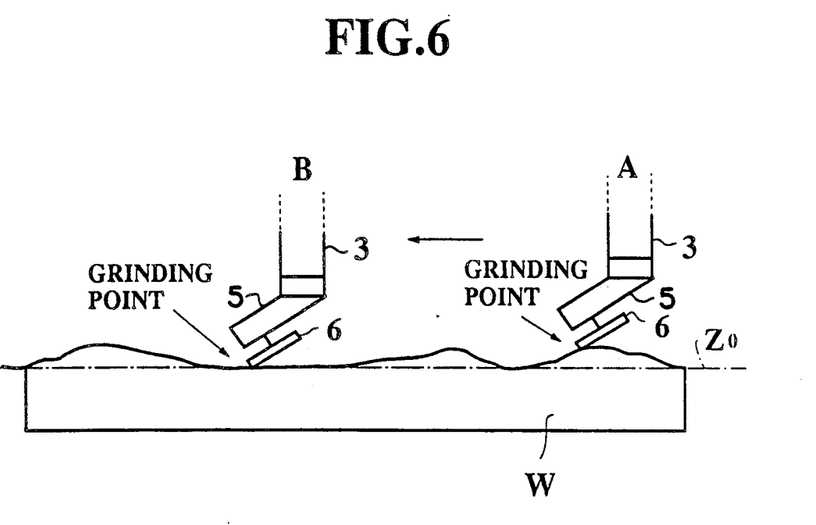
FIG. 6 and FIG. 7 illustrate outlines of various operations of the grinder robot shown in FIG. 1.

As described above, workpiece W may be ground by rotating grindstone 6 attached to grinder 5 with a position control operation or a force control operation. In this grinding procedure, a force control may be selected until the grinding point of the grinder reaches to a target surface and a position control may, then, be selected after it has reached to the target surface. Therefore, grindstone 6 may not be damaged by cutting into surfaces even if these are rugged as shown in FIG. 6. Also, grindstone 5 may not be spaced apart from a workpiece surface and may not grind surfaces beyond the target surface for finishing.

In place A shown in FIG. 6, grinder 5 is force controlled in the pushing direction, because the grinding point does not reach to the target surface of workpiece W for finishing. Grindstone 6, therefore, does not cut into the working surface and is not spaced apart from it.

The grinder, then, moves to place B where the grinding point has reached the target surface of workpiece W for finishing. In this place, the grinder is position controlled in the pushing direction. The grinder, therefore, does not grind the working surface the target surface for finishing. As a result, the work surface may be ground into a perfect plane quickly.

Figure 7:
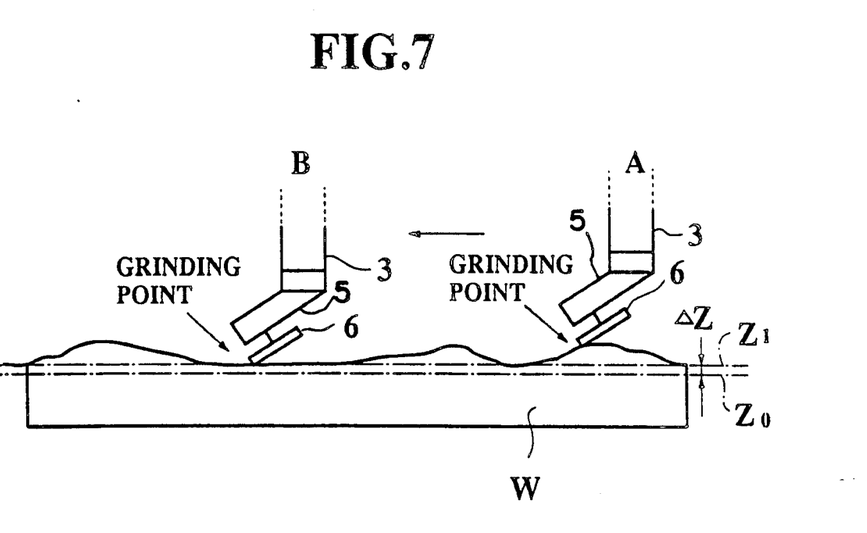

As shown in FIG. 7, a target surface for finishing may be set on position $Z_1$ which is just this side of or beneath the last target position $Z_0$ for finishing. In this case, a target plane for finishing may be formed only by the position control at the last stage of grindings. As a result, what is called a rough grinding can be processed quickly by the control shown in FIG. 5, and then a precise grindings can be processed only by the position control in order to increase grinding accuracy.

In this embodiment illustrated above, grinder 5 may be moved manually on a surface by using joy stick 8 shown in FIG. 2. It is, however, possible to move a grinder automatically on a plane as described in the second embodiment later.

In the embodiment illustrated above, arm 3 was moved against workpiece W. It is, however, possible to move workpiece W against arm 3 along all axes (X Y Z) or X and Y axes, because arm 3 and workpiece W can be moved relative to each other.

As mentioned above, the grinder robot in this embodiment may be operated by both force control and position control in the direction towards a workpiece. It is, therefore, possible to grind surfaces of a work quickly and accurately, without fears that a grinder might cut into a rugged work surface to damage the grinder, and that a grinder might be spaced apart from a workpiece surface.

Now, a grinder robot according to the second embodiment of this invention will be explained below.

The second embodiment is intended to further overcome a problem associated with the grinder robot of the first embodiment, in the case to move the grinder in a plane automatically. This problem is as follows. When grindings are executed by automatically feeding a grinder in a constant speed, a relatively slow speed may be selected as a grinder speed throughout the grindings. This is a speed set in conditions when grinding points are far from a target position for finishing and grindings of a workpiece are executed with relatively large grinding force by a force control operation. If this speed for feeding a grinder is used throughout the entire process of grindings, the process time will become longer unnecessarily. This is because the slow speed would be used even in a position control area where most part of the work surface has been grind into a target surface for finishing. If a high speed is selected throughout the entire grinding process, then, a grinding amount of every grinding in the force control area will become small. As a result, the total process time will become longer in both cases.

In this second embodiment, then, the relation between the feeding speed $V_f$ in a position control area and the feeding speed $V_s$ in a force control area may be determined to be a fixed relation, that is, $V_f > V_s$.

Figure 8:
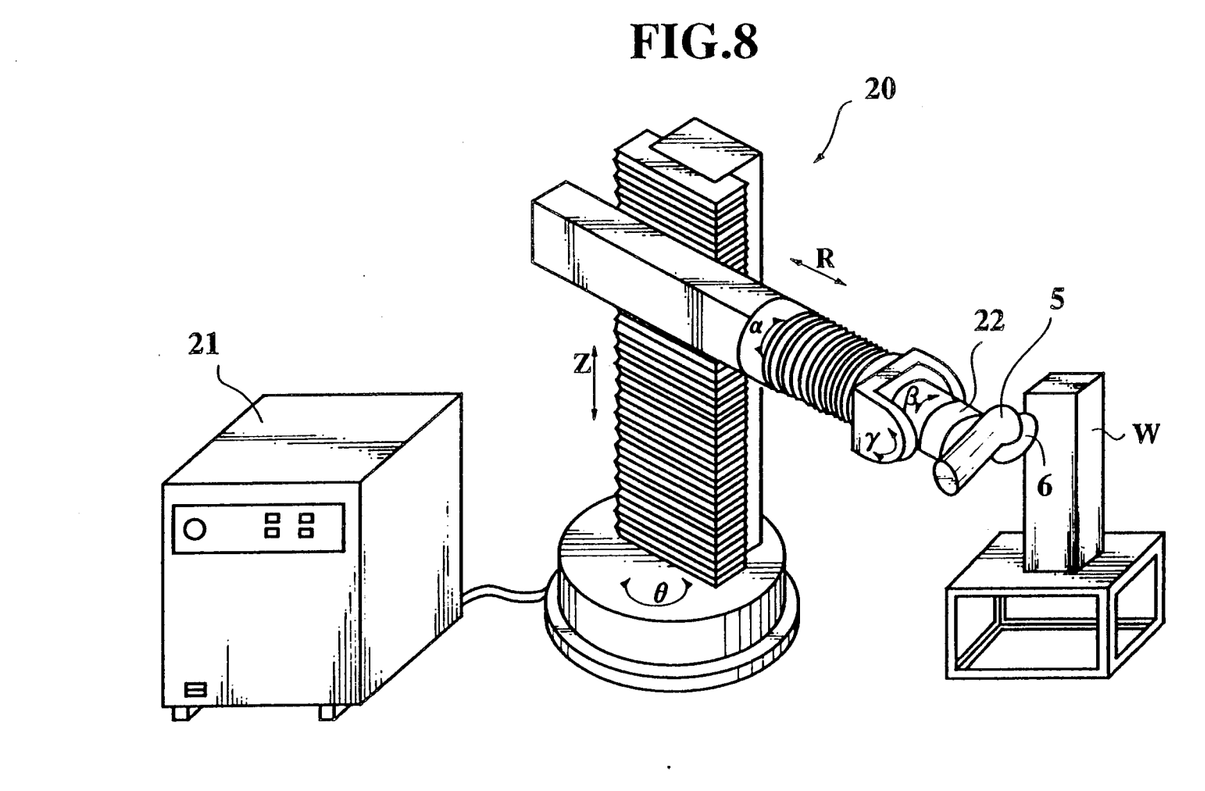
FIG. 8 is a schematic diagram showing the whole structure of a grinder robot according to the second embodiment of this invention.

FIG. 8 shows a schematic structure of a grinder robot according to the second embodiment of this invention. This grinder robot comprises a robot body 20 and a controller 21. Robot body 20 is a 6 degrees of freedom cylindrical coordinates type robot, and it has, basic 3 axes $\theta$, Z, R and 3 axes $\alpha$, $\beta$, $\gamma$ to control an end effector's orientation. Grinder 5, fixed to the tip of the robot arm, can be moved to any position in space with any orientation using said 6 axes so as to grind workpiece W by pushing a rotating grindstone 6 to the workpiece. The grinding force of grinder 5 during said grindings is always detected by a 6 axes force/torque sensor 22 placed between the robot arm 3 and grinder 5. The detected signals from the sensor 22 are, then, sent to controller 21. There are provided control means in controller 21. Grinding forces from grinder 5 and positions of the grinder tip are always observed by force detecting means and position detecting means. At grindings, loop selecting means may select force loop drive control means until a grinding point of the grinder reaches to a target position for finishing, which is indicated by an indicating means, and may select position loop drive control means after a grinding point has reached to said target position, under the condition that the grinding force is within set values, by the same way described in the first embodiment.

Figure 9:
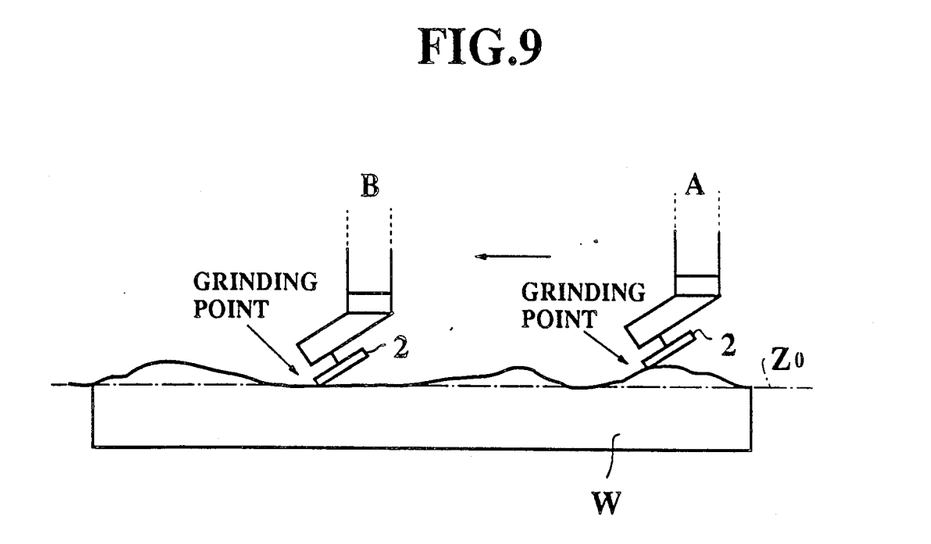
FIG. 9 illustrates an outline of a grinding operation.

FIG. 9 shows how a grinding is processed by said control means. At place A in the figure, the grinding point at the tip of the grinder has not yet reached the target position $Z_0$ of workpiece W. Grindstone 6 is, then, pushed to workpiece W in order to grind the workpiece surface by a force control. At place B in the figure, the grinding position at the tip of the grinder has already reached to target position $Z_0$ of work W. A position control may, then, be chosen in order not to grind into a work surface any more, and in order to finish the work surface into a predetermined shape accurately.

Figure 10:
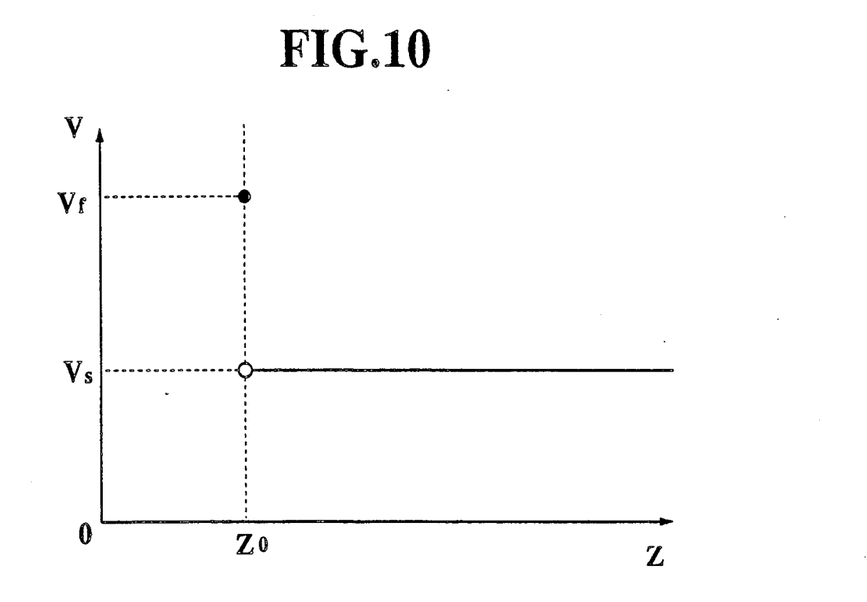
FIG. 10 and FIG. 11 are graphs showing the relations between grinding positions and feeding speeds of a grinder according to the second embodiment of this invention.
Figure 11:
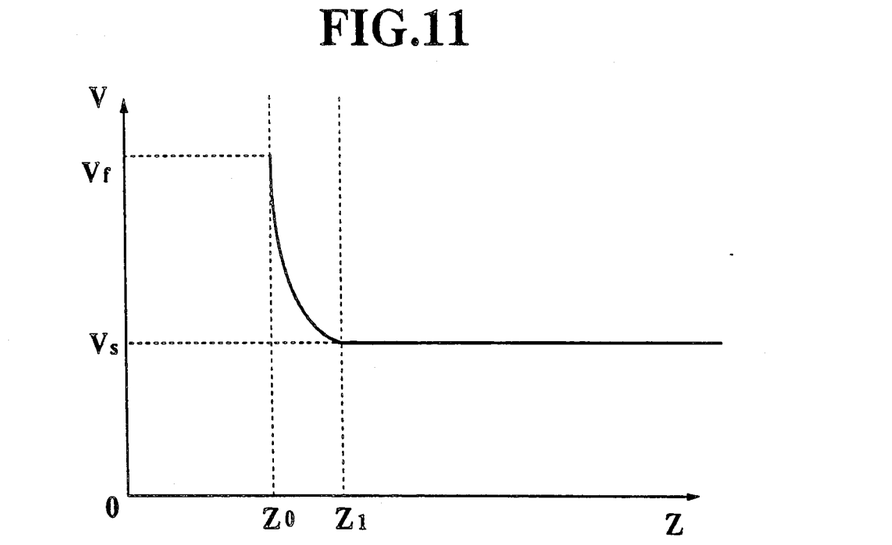

In FIGS. 10 and 11, the relation between grinding points and feeding speeds of a grinder is shown in the case that grindings are carried out automatically in order to grind a work surface into any shape by the grinder robot of this embodiment. The horizontal axes in the figure show positions Z of a grinder tip and the vertical axes show a feeding speed V of a grinder.

From FIG. 10, it is understood that the feeding speed V of a grinder may be set to a relatively slow speed $V_s$ when a grinding position Z of a grinder tip has not reached yet to a target position $Z_0$ and a force control is selected. It is also understood that the feeding speed V of a grinder may be changed to a relatively high speed $V_f$ after grinding position Z of a grinder tip has already reached to target position $Z_0$ and a position control is selected. If a feeding speed of a grinder is set according to said speed relation, that is, $V_f > V_s$, a grinding amount in every grinding becomes relatively large in places where a force control is selected, because the feeding speed selected in these places is relatively slow. On the other hand, in places where a position control is selected, a relatively high speed is set to feed the grinder. As a result, the processing time for the entire grindings may be further reduced.

As shown in FIG. 11, the feeding speed $V_f$ of a grinder may be changed to the feeding speed $V_s$ gradually between target position $Z_0$ and position $Z_1$, which is set to be close to $Z_0$. In this case, the feeding speed of a grinder does not change abruptly throughout the entire grinding process. Smooth grindings can, therefore, be executed by said speed control.

As mentioned above, in a grinder robot according to the second embodiment of this invention, a feeding speed of a grinder may be set relatively slow in places where a grinding point of a grinder has not reached yet to a target position when a force control is selected. During the grindings, then, a relatively large grinding amount in every grinding of a work surface can be carried out. On the other hand, the feeding speed in places where a grinding point has already reached to a target and a position control is selected, may be set faster than that in places where a force control is selected. As a result, the processing time of the entire grindings may be further reduced.

Various modifications will become possible for those skilled in the art after receiving the teachings of the present disclosure without departing from the scope thereof.

What is claimed is:

1. A grinder robot comprising:

a supporting structure for supporting a workpiece to be ground;

a grinding tool for grinding said workpiece;

an arm for supporting and feeding said grinding tool to a position in which said grinding tool contacts a surface of said workpiece and for driving said grinding tool to carry out a grinding operation in which said surface of said workpiece is ground into a uniform target plane;

controlling means for controlling said arm to effect said grinding operation by selectively controlling said arm in a first mode in which said grinding tool is fed toward said target plane at a constant force and a second mode in which said grinding tool is controlled to move along said target plane and not to grind said surface of said workpiece beyond said target plane;

wherein said controlling means controls the feeding of said grinding tool such that, when said grinding tool makes contact with said surface of said workpiece and is located at least a certain distance away from said target plane, said grinding tool is controlled in said first mode, and when said grinding tool reaches said target plane, said grinding tool is controlled in said second mode.

2. The robot arm of claim 1, wherein said controlling means controls said grinding tool such that, when said grinding tool is located nearer than said certain distance from said target plane, said grinding tool is fed at said constant force until said grinding tool makes contact with said surface of said workpiece.

3. The robot arm of claim 1, wherein, when said grinding tool is located nearer than said certain distance from said target plane, said controlling means controls the feeding of said grinding tool such that said grinding tool moves along said target plane at a speed which varies with the distance between said grinding tool and said target plane.

4. The grinder robot as claimed in claim 1, wherein said controller means comprises a loop selecting means, a position loop drive control means, and a force loop drive control means, and wherein said loop selecting means selects said force loop drive control means until said grinding tool reaches said target plane, and selects said position loop drive control means after said grinding tool has reached said target plane under the condition that a grinding force is in a set range of values.

5. The grinder robot as claimed in claim 4, wherein said controlling means changes the feeding speed of said grinding tool gradually so as not to change its feeding speed abruptly near the switching point between said force loop drive control means and said position loop drive control means.

6. The grinder robot as claimed in claim 1, further comprising indicating means for indicating, as said target plane, one of a last target plane for a finishing and a target plane for a rough finishing, which is set just above said last target plane.

7. A method of grinding a surface of a workpiece via a grinding tool which is supported on an arm of a robot, said method comprising the steps of:

moving said arm towards said workpiece to feed said grinding tool to a position in which said grinding tool contacts said surface of said workpiece and driving said grinding tool to carry out a grinding operation in which said surface of said workpiece is ground into a uniform target plane;

controlling said arm to effect said grinding operation by selectively controlling said arm in a first mode in which said grinding tool is fed toward said target plane at a constant force and a second mode in which said grinding tool is controlled to move along said target plane and not to grind said surface of said workpiece beyond said target plane;

wherein, when said grinding tool makes contact with said surface of said workpiece and is located at least a certain distance away from said target plane, said grinding tool is controlled in said first mode, and when said grinding tool reaches said target plane, said grinding tool is controlled in said second mode.

8. The robot arm of claim 7, wherein, when said grinding tool is located nearer than said certain distance from said target plane, said grinding tool is fed at said constant force until said grinding tool makes contact with said surface of said workpiece.

9. The robot arm of claim 7, wherein, when said grinding tool is located nearer than said certain distance from said target plane, the feeding of said grinding tool is controlled such that said grinding tool moves along said target plane at a speed which varies with the distance between said grinding tool and said target plane.

* * * * *